United States Patent [19]
Appel et al.

[11] 3,953,134
[45] Apr. 27, 1976

[54] AUTOMOTIVE WHEEL ALIGNMENT INSTRUMENT

[75] Inventors: Arthur V. Appel, Lake Forest; Robert S. Hampton, Northbrook; Leonard A. Morrison, Chicago, all of Ill.

[73] Assignee: Ammco Tools, Inc., North Chicago, Ill.

[22] Filed: Sept. 23, 1974

[21] Appl. No.: 508,089

[52] U.S. Cl............................. 356/155; 33/203.18
[51] Int. Cl.²......................................... G01B 11/26
[58] Field of Search ........... 356/155, 153, 172, 247, 356/255; 33/203.18, 203.15, 288; 353/98; 240/44.1

[56] References Cited
UNITED STATES PATENTS

| | | | |
|---|---|---|---|
| 1,962,356 | 6/1934 | Mihalyi | 240/44.1 |
| 1,991,861 | 2/1935 | May | 240/44.1 |
| 2,596,917 | 5/1952 | Reardon et al. | 353/98 |
| 3,393,455 | 7/1968 | MacMillan | 356/155 |
| 3,782,831 | 1/1974 | Senften | 356/155 |

*Primary Examiner*—John K. Corbin
*Assistant Examiner*—Jon W. Henry

[57] ABSTRACT

An optical wheel alignment instrument employs a pair of light weight units each housing a light source and optics including an adjustable mirror for directing a reticle image on a target screen of the other unit, and magnetic devices extend from the approximate centers of gravity of the units for mounting thereof to the hubs of the wheels to be aligned.

9 Claims, 5 Drawing Figures

U.S. Patent  April 27, 1976  3,953,134
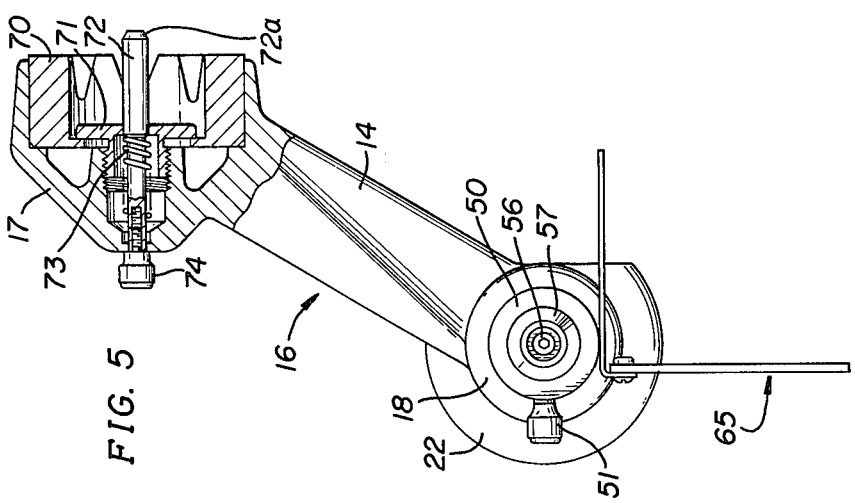
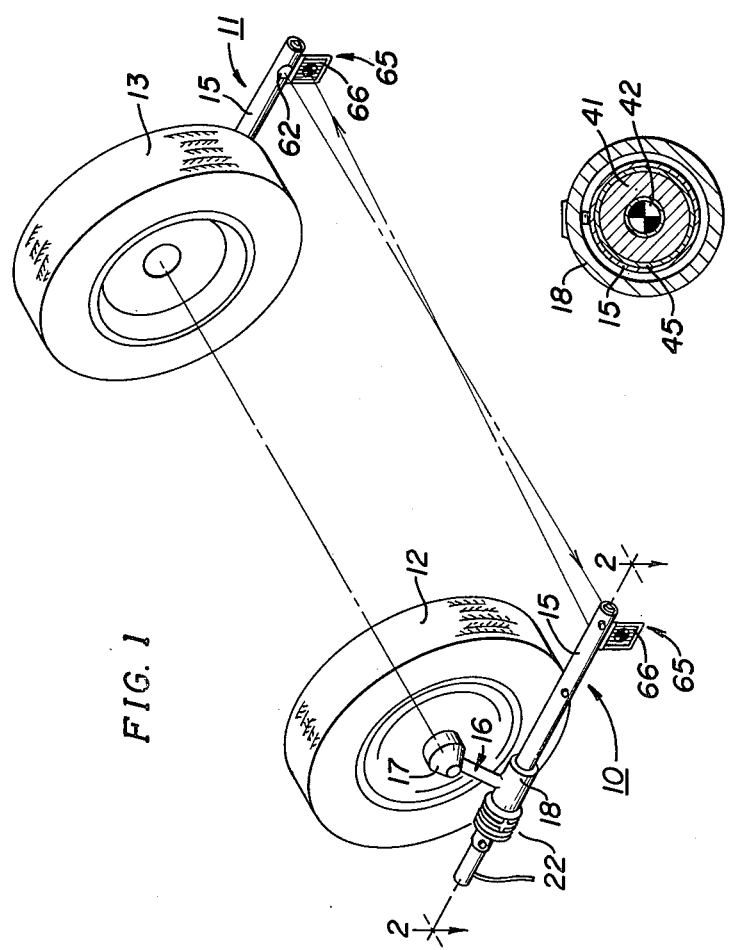
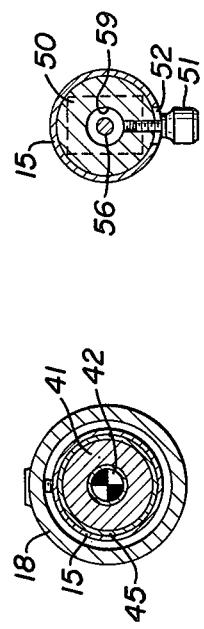
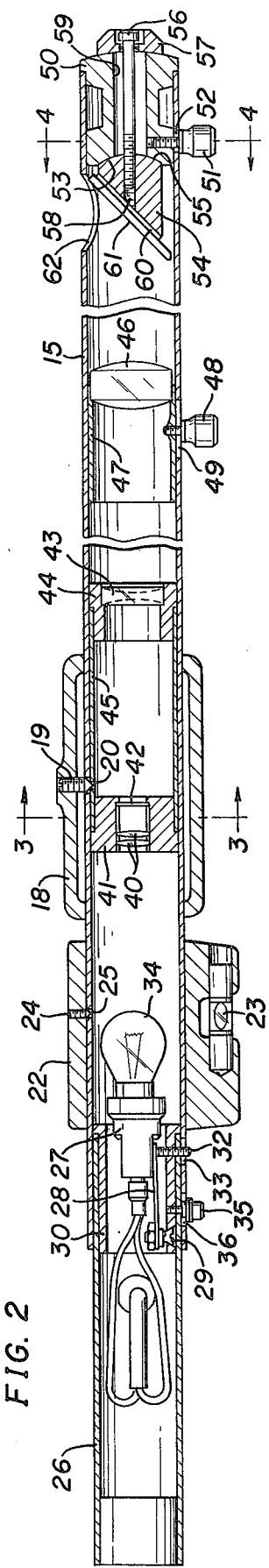

AUTOMOTIVE WHEEL ALIGNMENT INSTRUMENT

The present invention relates in general to wheel alignment instruments, and it relates more particularly to a new and improved optical toe gauge for measuring the toe or angular relationship in the horizontal plane of the wheels of automotive vehicles.

BACKGROUND OF THE INVENTION

For efficient operation and handling of an automotive vehicle it is necessary that the front wheels have certain angular relationships relative to one another as well as to the frame of the vehicle. One such angle is referred to in the art as the toe which is the angular relationship of the principal planes of the wheels to the vertical plane containing the longitudinal axis of the frame of the vehicle. Various instruments have been designed and used for this purpose but they have not been satisfactory in regard to cost, durability, ease of use and accuracy.

SUMMARY OF THE PRESENT INVENTION

Briefly, there is provided in accordance with the teachings of the present invention an optical toe gauge comprising a pair of light weight units respectively attachable to the hub poritons or spindles of the wheels solely by magnetic devices. The lamp and associated optical systems includes an adjustable mirror located near the foreward end of each unit and the magnetic wheel attachment devices are positioned at the centers of gravity of the units whereby additional supports and the problems associated therewith are obviated.

BRIEF DESCRIPTION OF THE DRAWINGS

Further objects and advantages and a better understanding of the present invention can be had by reference to the following detailed description, wherein:

FIG. 1 is a perspective view showing the use and operation of the present invention;

FIG. 2 is a horizontal section taken along the line 2—2 of FIG. 1;

FIG. 3 is a sectional view taken along the line 3—3 of FIG. 2;

FIG. 4 is a sectional view taken along the line 4—4 of FIG. 2, and

FIG. 5 is a vertical cross-section of the magnetic wheel attachment assembly.

DETAILED DESCRIPTION

Referring now to the drawings and particularly to FIG. 1 thereof, a pair of units 10 and 11, which are mirror images of one another but otherwise identical, are respectively mounted to the hub portions of the front wheels 12 and 13 of an automotive vehicle (not shown). Inasmuch as the units 10 and 11 are substantially identical only the unit 10 is described in detail hereinafter.

With reference to FIGS. 1 and 2, the unit 10 comprises an elongated tubular housing 15 which extends a substantial distance forwardly of the wheel 12 and is attached to the wheel 12 in parallelism with the plane thereof by means of a wheel mount assembly 16 including a magnetic mounting clamp 17 described in greater detail hereinafter. The mount 16 includes a metal casting having an arm 14 and an integral tubular section 18 through which the housing tube 15 extends. A set screw 19 is threaded in the tubular portion 18 and is adapted to extend into a hole 20 in the side of the housing tube 15 for locking the tube 15 in a fixed predetermined position in the mount 16. The location of the hole 20 is at approximately the center of gravity of the overall unit 10 whereby the unit 10 may be solely supported by the wheel 12 and the housing tube 15 will remain in a horizontal position when so placed by the operator. A heat radiator 22 having a plurality of cooling fins surrounds the housing 15 rearwardly of the mount 16 and a spirit level 23 is mounted on the radiator parallel to the longitudinal axis of the tube 15 to facilitate mounting of the unit 10 to the wheel 12 with the housing tube 15 in a horizontal position. The heat radiator 22 is fixedly positioned on the housing tube 15 by means of a set screw 24 extending partially into a hole 25 in the side of the housing tube 15.

A lamp support tube 26 is telescopically fitted into the rear end of the housing tube 15 and a lamp socket 27 is mounted in the tube 26 in cantilever fashion on a plate 28 immovably secured at the rear end by a nut and bolt assembly 29 to a sleeve 30 fitted in the forward end of the tube 26. A set screw 32 is threadedly received in a hole in the side of the sleeve 30 and is accessible from outside of the unit 10 through a slot 33. The screw 32 is used to adjust the position of a projection lamp bulb 34 relative to the longitudinal axis of the housing 15. The lamp 34 is secured in a suitable socket connector 27 within the annular heat radiator 22. The tube 26 and the parts mounted thereto are adjustable in an axial direction within the housing tube 15, and a finger screw 35 extending through a slot 36 in the wall of the housing tube 15 through a hole in the tube 26 and threaded into a hole in the sleeve 30 is used both to adjust the position of the lamp 34 along the axis of the housing tube 15 and to lock the lamp in the adjusted position.

A set of condensor lenses 40 are supported along the longitudinal axis of the housing tube 15 by means of a mounting sleeve 41 secured in the rear end of a tube 45 which is fixedly positioned within the housing 15 by the set screw 19. A reticle 42, best shown in FIG. 3, is also mounted in the sleeve 41 and a compound lens 43 is mounted in a sleeve 44 secured in the forward end of the tube 45.

an objective lens 46 is supported in a sleeve 47 which is adapted to be slidably adjusted along the longitudinal axis of the housing tube 15 by means of a finger screw 48 which extends through a longitudinal slot 49 in the side of the housing tube 15 and is threaded into a hole in the wall of the tube 47. For adjusting the position of the objective lens 46 the screw 48 is loosened, the sleeve 47 is then axially adjusted and the screw 48 is retightened to secure the lens in the adjusted position.

Mounted at the front end of the housing tube 15 is a sleeve-like member 50 which is held in place by means of a finger screw 51 extending through an arcuate slot 52 in the wall of the tube 15 and threadedly received in a threaded opening in the member 50. The member 50 is thus rotatably adjustable to an extent limited by the length of the slot 52. The inner or rear end of the member 50 is provided with a concave surface 53, and a mirror mount 54 having a convex surface 55 matching the curvature of the concave surface 53 is held against the rearward end of the member 50 by means of a screw 56 having a head portion located in the counterbore of a calibration knob 57. The screw 56 is threadedly received in a hole 58 in the mirror mount 54 and when tightened locks the mirror mount in an adjusted position by compressing the surfaces 53 and 55 together. The body of the screw 56 extends through a hole 59 in the member 50 so that when the screw 56 is slightly loosened, the knob 57 may be used to pivot the mirror support 50 in a horizontal direction about the center of curvature of the surfaces 53 and 55.

The inner end 60 of the mirror mount 53 extends at an angle of 45° relative to the longitudinal axis of the threaded hole 58 and a planar mirror 61 is bonded thereto by any suitable means such as cement. A window 62 is provided in the housing tube 15 adjacent the mirror 61 which may thus direct the light from the lamp 34 in a horizontal direction perpendicular to the longitudinal axis of the housing tube 15.

Depending from the forward end of the housing tube 15 is a planar target screen 65 which is adjustable in a direction parallel to the longitudinal axis of the housing tube 15 and which is provided with a plurality of graduated vertical linges 66 (FIG. 1) onto which the image of the retical 42 from the other unit is focused. The position of the recticle image on the target screen 65 indicates the angular relationship or toe of the opposite wheel.

Referring to FIG. 5 the magnetic mounting clamp includes an annular permanent magnet 70 held in place to the mount assembly 16 by means of a cap screw 71. A centering pin 72 having a tapered end 72a is biased in an outward direction by a spring 73 and a finger knob 74 is attached thereto. When the gauge is being mounted onto the wheel hub, the clamp 17 is grasped with the thumb pushing the knob 74, so the pin 72 can find the center hole in the wheel spindle before the magnet locks on. This method also allows the user to slowly release thumb pressure on the knob 74 in order to ease the magnet onto the wheel hub, thus avoiding a jolt to the gauge. In the same manner, when removing the gauge thumb pressure can be applied to the knob 74 to help pull the magnet off the wheel hub. The pin 72 thus fits into the axial recess at the end of the wheel spindle to accurately align the unit with the axis of rotation of the wheel. Controlled rotation of the mount 16 relative to the wheel spindle permits the operator, with the aid of the level 23, to set the tube 15 in the horizontal position. The magnet 70 has sufficient strength to hold the relatively light unit 10 in the adjusted position inasmuch as the support 16 is attached to the remainder of the unit at the approximate center of gravity thereof. The relatively minor movement of the center of gravity due to axial adjustments of the tube 26, the objective lens 43 and the mirror 61 are insufficient to overcome the holding force of the magnet whereby turning of the wheels does not spuriously move the units relative to the wheels.

OPERATION

In use, the hub and dust caps are removed from the wheel spindles and the units 10 and 11 are attached thereto by placing the magnetic mounting clamps against the hubs of the wheels over the wheel nuts which fit in the central openings in the magnets 70 with the centering pins extending into the axial holes in the ends of the wheel spindles. The housing tubes 15 are thus parallel to the planes of the wheels and are then adjusted to the horizontal position while observing the spirit levels 23. The units are then energized by plugging the electric connectors thereof into suitable electric outlets, whereby the images of the reticles 42 appear on the opposite target screens 65. The objective lens 46 in each unit may then be axially adjusted to focus the respective reticle on the target screen of the other unit. The angles of toe are thereby indicated directly on the target screens whose graduations 66 are labeled with the corresponding toe angles.

In order to calibrate the units 10 and 11, they are placed on the ends of a straight calibrating bar having perpendicular end faces and the target screens are adjusted so that the reticle images are at the graduation lines 66 indicating 0° toe.

The present invention thus provides a light weight, durable toe gage which may be quickly and easily used. The use of the mirrors 61 at the front and the light sources at the rear enable the use of the magnetic mounts without any additional supports whereby the wheels can be freely rotated on any surface without altering the positions of the units 10 and 11 on the wheels. The mirrors being light in weight are easily and accurately adjusted for calibration purposes.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. An instrument for measuring the angular relationship between the front wheels and frame of an automotive vehicle, comprising
    an elongated support member,
    means for mounting said support member to one of said wheels in substantial parallelism with the plane of rotation of the wheel and with the forward end of said support member extending forwardly of said wheel,
    a target screen,
    means mounting said target screen to the other of said wheels in substantial parallelism with the plane thereof and forwardly thereof,
    a lamp mounted to said support member near the rearward end thereof,
    mirror means mounted to said support member near the forward end thereof for deflecting light from said lamp at substanially a right angle in a direction parallel to the axis of rotation of said one wheel onto said target screen,
    an optical system including a reticle mounted to said support member between said lamp and said mirror for focusing an image of said reticle through said mirror means onto said target screen, and
    said means for mounting providing the sole support for said support member and being fixedly secured to said support member.

2. The invention according to claim 1 wherein said means for mounting comprises a permanent magnet.

3. The invention according to claim 1 wherein said support member comprises
    an elongated tubular housing, and
    said lamp, mirror and optical system are mounted within said housing.

4. The invention according to claim 3 wherein said housing comprises
    a plurality of telescoping tubes axially slidable for adjusting the focus of the image of said reticle on said target.

5. the invention according to claim 3 comprising calibrating means accessible from outside said housing for adjusting the angle of said mirror relative to the axis of said housing.

6. The invention according to claim 5 wherein said calibrating means comprises
an arm connected to said mirror means and extending generally along the longitudinal axis of said housing externally from one end thereof and angularly movable in a vertical plane, and
means for securing said arm in the adjusted position.

7. The invention according to claim 6 wherein said mirror means comprises
a member having a convex surface,
a tubular support fitted in said housing and having a concave surface receiving said convex surface, and
said arm being secured to said member and extending through said tubular support.

8. The invention according to claim 5 comprising adjustment means for rotatably adjusting the angle of said mirror about the longitudinal axis of said housing.

9. The invention according to claim 7, comprising adjustment means for rotating said tubular support in said housing to adjust the angle of said mirror about the longitudinal axis of said housing.

* * * * *